United States Patent
Lee et al.

(10) Patent No.: US 12,515,187 B2
(45) Date of Patent: Jan. 6, 2026

(54) MATERIAL SYNTHESIS APPARATUS AND OPERATING METHOD THEREOF

(71) Applicant: SAMSUNG ELECTRONICS CO., LTD., Suwon-si (KR)

(72) Inventors: Sangyoon Lee, Yongin-si (KR); Jaejun Chang, Gwacheon-si (KR); Byungkwon Choi, Seongnam-si (KR); Younsuk Choi, Seongnam-si (KR); Jinwoo Park, Suwon-si (KR); Taesin Ha, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1098 days.

(21) Appl. No.: 17/520,238

(22) Filed: Nov. 5, 2021

(65) Prior Publication Data
US 2022/0331772 A1 Oct. 20, 2022

(30) Foreign Application Priority Data
Apr. 20, 2021 (KR) .................... 10-2021-0051356

(51) Int. Cl.
*B01J 19/00* (2006.01)
*G05B 13/04* (2006.01)

(52) U.S. Cl.
CPC ........ *B01J 19/0033* (2013.01); *G05B 13/048* (2013.01); *B01J 2219/00243* (2013.01)

(58) Field of Classification Search
CPC ...... G16C 20/70; G16C 20/10; G05B 13/048; G05B 13/0265
See application file for complete search history.

(56) References Cited

U.S. PATENT DOCUMENTS

| 8,426,042 | B2 | 4/2013 | Takada et al. |
| 10,832,800 | B2 | 11/2020 | Kobilka et al. |
| 2020/0379442 | A1* | 12/2020 | Chan .................... B01J 19/0033 |
| 2022/0172802 | A1* | 6/2022 | Konstantinov ........ G16C 20/70 |
| 2022/0397886 | A1* | 12/2022 | Hong .................... G16C 20/10 |

FOREIGN PATENT DOCUMENTS

| CN | 109872780 A | 6/2019 |
| WO | 2020/058516 A1 | 3/2020 |

OTHER PUBLICATIONS

Sebastian Steiner et al., "Organic synthesis in a modular robotic system driven by a chemical programming language", Science, vol. 363, Issue 6423, eaav2211, 2018, 7 pages.

(Continued)

*Primary Examiner* — Shogo Sasaki
(74) *Attorney, Agent, or Firm* — Sughrue Mion, PLLC

(57) ABSTRACT

A material synthesis apparatus may include a synthesis device configured to perform a synthesis of a material of a target product; a communication interface configured to receive a first synthesis method of the target product, the first synthesis method being calculated by an external apparatus using a previously trained synthesis prediction model; and a processor configured to: determine first commands for synthesizing the target product based on the first synthesis method, schedule an order in which the first commands are executed, and control the synthesis device based on the scheduled order.

20 Claims, 11 Drawing Sheets

(56) References Cited

OTHER PUBLICATIONS

Jack Dawson, "High-Throughput Screening at Biosafety Level 2 with High Flexibility: MicroStar BSL2", JALA, 14(3), pp. 133-140, 2009, 8 pages.

Jidon Jang et al., "Structure-Based Synthesizability Prediction of Crystals Using Partially Supervised Learning", J. Am. Chem. Soc. 2020, vol. 142, pp. 18836-18843, 2020.

Connor W. Coley et al., "A robotic platform for flow synthesis of organic compounds informed by AI planning", Science, vol. 365, Issue 6453, eaax1566, 2019, 11 pages.

* cited by examiner
MATERIAL SYNTHESIS APPARATUS AND OPERATING METHOD THEREOF

CROSS-REFERENCE TO RELATED APPLICATION

This application is based on and claims priority under 35 U.S.C. § 119 to Korean Patent Application No. 10-2021-0051356, filed on Apr. 20, 2021, in the Korean Intellectual Property Office, the disclosure of which is incorporated by reference herein in its entirety.

BACKGROUND

1. Field

The present disclosure relates to a material synthesis apparatus and an operating method thereof.

2. Description of Related Art

Techniques of obtaining information about a target product, calculating a synthesis method for preparing the target product based on the obtained information, and controlling a synthesis device based on the calculated synthesis method are widely used for research purposes as well as industrial purposes.

In material synthesis techniques of the related art, research on a technique for controlling a synthesis device based on a calculated synthesis method is insufficient. In order to optimize a process of synthesizing materials, a technique of determining commands for synthesizing a target product and scheduling the order in which the determined commands are executed based on a synthesis method is required.

SUMMARY

Provided are material synthesis apparatuses and operating methods thereof. Provided are non-transitory computer-readable recording media having recorded thereon programs for executing the above methods on computers. Technical aspects of the present disclosure are not necessarily limited thereto, and other technical aspects of the present disclosure may be inferred from the following embodiments.

Additional aspects will be set forth in part in the description which follows and, in part, will be apparent from the description, or may be learned by practice of the presented embodiments of the disclosure.

According to an aspect of an embodiment, a material synthesis apparatus may include a synthesis device configured to perform a synthesis of a material of a target product; a communication interface configured to receive a first synthesis method of the target product, the first synthesis method being calculated by an external apparatus using a previously trained synthesis prediction model; and a processor configured to: determine first commands for synthesizing the target product based on the first synthesis method, schedule an order in which the first commands are executed, and control the synthesis device based on the scheduled order.

According to an aspect of another embodiment, an operating method of a material synthesis apparatus may include receiving a first synthesis method of a target product, the first synthesis method being calculated by an external apparatus using a previously trained synthesis prediction model; determining first commands for synthesizing the target product based on the first synthesis method; scheduling an order in which the first commands are executed; and controlling a synthesis device based on the scheduled order.

According to an aspect of another embodiment, a non-transitory computer-readable recording medium may have recorded thereon a program that, when executed by a processor, causes the processor to: receive a first synthesis method of a target product, the first synthesis method being calculated by an external apparatus using a previously trained synthesis prediction model; determine first commands for synthesizing the target product based on the first synthesis method; schedule an order in which the first commands are executed; and control a synthesis device based on the scheduled order.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
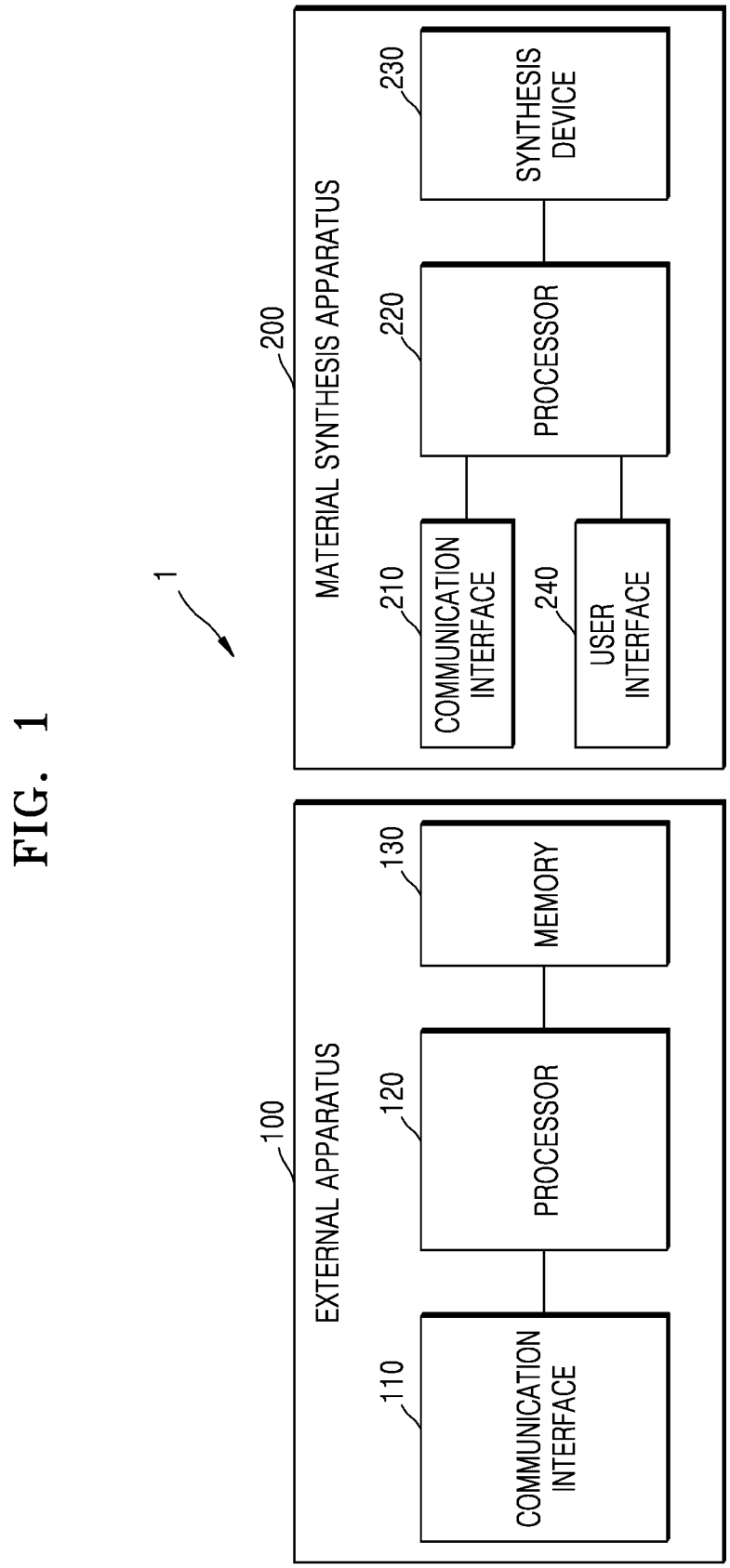
FIG. 1 is a block diagram illustrating a configuration of a material synthesis system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Phrases such as "in some embodiments" or "in an embodiment" appearing in various parts of the present disclosure should not be construed as always referring to the same embodiment(s).

The terms used in the present disclosure are general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

The terms of a singular form may include plural forms unless otherwise mentioned. It will be further understood that the terms "comprises" and/or "comprising" used herein specify the presence of stated features or elements, but do not preclude the presence or addition of one or more other features or elements.

In the following descriptions of the embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

It will be understood that although terms including ordinal numbers such as "first" and "second" may be used herein to describe various elements, these elements should not be limited by these terms. These terms are only used to distinguish one element from element.

Some embodiments of the present disclosure may be implemented as functional blocks and various processing operations. Some or all of the functional blocks may be implemented with various hardware and/or software configurations executing specific functions. For example, the functional blocks of the present disclosure may be implemented with one or more microprocessors or circuit configurations having given functions. In addition, the functional blocks of the present disclosure may be implemented with various programming or streaming languages. The functional blocks may be implemented by algorithms executed on one or more processors. Also, embodiments of the present disclosure may employ conversional arts to establish an electronic environment, process signals and/or process data. Terms such as "mechanism," "element," "means," and "configuration" may be widely used and are not limited to mechanical and physical configurations.

Furthermore, line connections or connection members between elements depicted in the drawings represent functional connections and/or physical or circuit connections by way of example. In actual applications, connections between elements may be implemented with various additional functional connections, physical connections or circuit connections.

The following descriptions of the embodiments should not be construed as limiting the scope of the present disclosure, and modifications or changes that could be easily made from the embodiments by those of ordinary skill in the art should be construed as being included in the scope of the present disclosure. Hereinafter, example embodiments will be described with reference to the accompanying drawings.

FIG. 1 is a block diagram illustrating a configuration of a material synthesis system 1 according to an embodiment.

Referring to FIG. 1, the material synthesis system 1 may include an external apparatus 100 and a material synthesis apparatus 200.

The external apparatus 100 may correspond to any apparatus without limitation as long as it is an apparatus for calculating a synthesis method for preparing a target product. For example, the external apparatus 100 may correspond to a server apparatus and/or a mobile terminal.

The external apparatus 100 may include a communication interface 110, a processor 120, and a memory 130. Here, FIG. 1 illustrates only elements of the external apparatus 100 which are related to the present embodiment. Therefore, it is obvious to those of ordinary skill in the art that the external apparatus 100 may further include general-purpose elements in addition to the elements shown in FIG. 1.

Furthermore, when an objective of the present disclosure is achievable using only some of the elements shown in FIG. 1, an apparatus including only some of the elements shown in FIG. 1 may correspond to the external apparatus 100. For example, the external apparatus 100 may include only the communication interface 110 and the processor 120, and the memory 130 may be external to the external apparatus 100.

The communication interface 110 may transmit and receive various types of data. The external apparatus 100 may communicate with the material synthesis apparatus 200 through the communication interface 110. For example, the external apparatus 100 may transmit a synthesis method of a target product to the material synthesis apparatus 200 through the communication interface 110. The synthesis method of the target product may be calculated by the external apparatus 100 using a previously trained synthesis prediction model.

The external apparatus 100 may receive results of synthesis from the material synthesis apparatus 200 through the communication interface 110. The results of synthesis may be obtained from a material synthesis method provided by the external apparatus 100.

In addition, the external apparatus 100 may transmit a stop command to the material synthesis apparatus 200 through the communication interface 110. The stop command may be determined by the external apparatus 100 based on the results of synthesis or intermediate production information.

The communication interface 110 may include a short-range wireless communication interface, a mobile communication interface, etc. The short-range wireless communication interface may include a Bluetooth communication interface, a Bluetooth Low Energy (BLE) communication interface, a near field communication interface, a wireless local area network (WLAN) communication interface, a Zigbee communication interface, an infrared (Infrared Data Association (IrDA)) communication interface, a wireless fidelity (Wi-Fi) Direct (WFD) communication interface, an ultrawideband (UWB) communication interface, an Ant+ communication interface, etc., but is not necessarily limited thereto.

The memory 130 is hardware storing various types of data about processes in the external apparatus 100, and for example, the memory 130 may store data that is processed and is to be processed by the external apparatus 100. In addition, the memory 130 may store applications, drivers, etc., to be executed on the external apparatus 100.

The memory 130 may include random access memory (RAM), such as dynamic random access memory (DRAM) and static random access memory (SRAM), read-only memory (ROM), electrically erasable programmable read-only memory (EEPROM), a CD-ROM, a Blu-ray or other optical disk storage, hard disk drives (HDDs), solid state drives (SSDs), or flash memory, and an external storage device that is accessible by the external apparatus 100.

In addition, the previously trained synthesis prediction model may be stored in the memory 130. The synthesis prediction model may be generated by the processor 120 based on a database such as Reaxys or SciFinder. For example, the processor 120 may generate the synthesis prediction model using a deep neural network (DNN), a recurrent neural network (RNN), a conditional variational autoencoder (CVAE), etc.

The synthesis prediction model may store structure information of a reactant, structure information of a product, a synthesis route, a predicted yield, a predicted amount of yield, and a predicted time required for synthesis. The predicted yield, the predicted amount of yield, and the predicted time required for synthesis may depend on synthesis conditions. The processor 120 may update the synthesis prediction model by receiving at least one of the predicted yield, the predicted amount of yield, and the predicted time required for synthesis from the synthesis prediction model, or by receiving results of synthesis as feedback from the material synthesis apparatus 200.

For example, the processor 120 may update the synthesis prediction model to increase a yield or an amount of yield of the product. Alternatively, the processor 120 may update the synthesis prediction model to decrease a time required for synthesis of the product. Because the synthesis prediction model is updated, an optimized synthesis prediction model capable of obtaining results of synthesis desired by a user may be generated.

The processor 120 calculates the synthesis method for preparing the target product. For example, the processor 120 calculates the synthesis method for preparing the target product by executing programs stored in the memory 130 of the external apparatus 100. The processor 120 may be implemented as a central processing unit (CPU), a graphics processing unit (GPU), an application processor (AP), etc., included in the external apparatus 100, but is not necessarily limited thereto.

The processor 120 may use the synthesis prediction model stored in the memory 130 to calculate the synthesis method for preparing the target product. The synthesis prediction model may be at least one of the DNN, the RNN, and the CVAE, but is not necessarily limited thereto.

The synthesis method may include a synthesis route and synthesis conditions. The synthesis route may refer to a chemical reaction for preparing a product using reactants. For example, when a biaryl compound is prepared as a produce by using an organo-boronic compound and a halogenated aryl compound as reactants, the synthesis route may be a Suzuki-Miyaura reaction. A plurality of synthesis routes may exist according to structure information of reactants and structure information of the product.

The synthesis conditions may refer to various conditions of a chemical reaction which are set for preparing the product by using reactants, and at least one synthesis condition may be set for one synthesis route. For example, the synthesis conditions may include at least one of a catalyst, a base, a solvent, a reagent, a temperature, and a reaction time, but is not necessarily limited thereto.

A test data set for training the synthesis prediction model may include structure information of reactants and structure information of products, and may further include synthesis routes and synthesis conditions included in the synthesis method. The processor 120 may train the synthesis prediction model using the test data set.

The processor 120 may predict prediction results of synthesis by using the previously trained synthesis prediction model according to the structure information of reactants, the structure information of products, the synthesis routes, and the synthesis conditions. For example, the prediction results of synthesis may include at least one of the predicted yield, the predicted amount of yield, and the predicted time required for synthesis, but are not necessarily limited thereto. In addition, the processor 120 may predict prediction production information of the target product at a specific time during a reaction progress by using the previously trained synthesis prediction model. The prediction production information may include at least one of a prediction amount of production and a molar ratio with a prediction reactant, but is not necessarily limited thereto.

The processor 120 may receive actual results of synthesis of the product corresponding to the synthesis routes and the synthesis conditions from the material synthesis apparatus 200 and additionally train the synthesis prediction model by using the received actual results of synthesis. For example, the actual results of synthesis may include at least one of an actual yield, an actual amount of yield, and an actual time required for synthesis, but are not necessarily limited thereto.

The processor 120 may determine a synthesis route for synthesizing the target product by using the previously trained synthesis prediction model. The processor 120 may determine synthesis conditions with respect to the determined synthesis route by using the previously trained synthesis prediction model, and may calculate a first synthesis method based on the determined synthesis route and the synthesis conditions. The processor 120 transmits the first synthesis method to the material synthesis apparatus 200 through the communication interface 110.

The processor 120 may receive results of synthesis according to the first synthesis method from the material synthesis apparatus 200 and additionally train the synthesis prediction model by using the received results of synthesis according to the first synthesis method. The processor 120 may determine a synthesis route for synthesizing a target product, determine synthesis conditions for the determined synthesis route, by using the previously trained synthesis prediction model, and calculate a second synthesis method of the target product different from the first synthesis method based on the determined synthesis route and the synthesis conditions. The processor 120 transmits the second synthesis method to the material synthesis apparatus 200 through the communication interface 110.

The material synthesis apparatus 200 may correspond to any apparatus for synthesizing materials without limitation. For example, the material synthesis apparatus 200 may correspond to an apparatus used for synthesizing a material in a small amount for research purposes as well as an apparatus used for industrially producing a large amount of a chemical product. In addition, a "material" may refer to a product synthesized by a chemical method, and may include a single molecule, a polymer, and an organometallic compound, but is not necessarily limited thereto.

The material synthesis apparatus 200 may include a communication interface 210, a processor 220, and a synthesis device 230. However, FIG. 1 illustrates only elements of the material synthesis apparatus 200 which are related to the present embodiment. Therefore, it is obvious to those of ordinary skill in the art that the material synthesis apparatus 200 may further include general-purpose elements in addition to the elements shown in FIG. 1.

Furthermore, when an objective of the present disclosure is achievable using only some of the elements shown in FIG. 1, an apparatus including only some of the elements shown in FIG. 1 may correspond to the material synthesis apparatus 200. For example, the material synthesis apparatus 200 may include only the communication interface 210 and the processor 220, and the synthesis device 230 may be external to the material synthesis apparatus 200.

The communication interface 210 may transmit and receive various types of data. The material synthesis apparatus 200 may communicate with the external apparatus 100 through the communication interface 210. For example, the material synthesis apparatus 200 may receive a synthesis method of a target product through the communication interface 210. The synthesis method of the target product may be calculated by the external apparatus 100 using a previously trained synthesis prediction model. In addition, the material synthesis apparatus 200 may receive a stop command based on results of synthesis or intermediate production information from the external apparatus 100 through the communication interface 210. In addition, the material synthesis apparatus 200 may transmit results of synthesis according to the synthesis method of the target product to the external apparatus 100 through the communication interface 210.

The communication interface 210 may include a short-range wireless communication interface, a mobile communication interface, etc. The short-range wireless communication interface may include a Bluetooth communication interface, a BLE communication interface, an NFC interface, a WLAN communication interface, a Zigbee communication interface, an infrared (IrDA) communication interface, a WFD communication interface, a UWB communication interface, an Ant+ communication interface, etc., but is not necessarily limited thereto.

The synthesis device 230 may synthesize a material for producing the target product. For example, the synthesis device 230 may include any one of a storage device (331 of FIG. 3), a carrier (332 of FIG. 3), a dispenser (333 of FIG. 3), a reactor (334 of FIG. 3), a collector (335 of FIG. 3), and an analyzer (336 of FIG. 3) or combinations thereof, but is not limited thereto.

The storage device 331 may be used to store reagents in a predetermined environment, and examples of the storage device 331 may include a refrigerator, a hot storage cabinet, and a vacuum chamber. The carrier 332 may be used to move reagents or tools to a specific location, and examples of the carrier 332 may include a transfer robot, a lift, and a conveyor belt.

The reactor 334 may include a reaction vessel in which a chemical reaction may occur, and may also include a heater or a pump to control the temperature or gas composition in the reaction vessel. The dispenser 333 may be used to inject a reagent into the reaction vessel, and the collector 335 may be used to collect a sample from the reaction vessel. Examples of the dispenser 333 and the collector 335 may include syringes, pipettes, burettes, and droppers. The analyzer 336 may be used to analyze a sample, and, if necessary, the analyzer 336 may perform a pretreatment on a sample before analyzing the sample. Examples of the analyzer 336 may include a scale, a chromatographer, and a spectrometer.

The synthesis device 330 of the present disclosure is not limited to the above-mentioned examples of the storage device 331, the carrier 332, the dispenser 333, the reactor 334, the collector 335, and the analyzer 336.

The processor 220 controls all functions for operating the material synthesis apparatus 200. For example, the processor 220 generally controls the material synthesis apparatus 200 by determining commands for synthesizing the target product and scheduling orders in which the commands are executed. The processor 220 may be implemented as a central processing unit (CPU), a graphics processing unit (GPU), an application processor (AP), etc. included in the material synthesis apparatus 200, but is not necessarily limited thereto.

The processor 220 may use the synthesis method received from the external apparatus 100 to determine the commands for synthesizing the target product. The synthesis method may be received by the material synthesis apparatus 200 in the form of a file. For example, the synthesis method may be received by the communication interface 210 in the form of a Java Script Object Notation (JSON) file, but is not necessarily limited thereto. In addition, the processor 220 may use a synthesis method obtained from the user through the user interface 240.

The user interface 240 may refer to means used to input the synthesis method of the target product. The user interface 240 may include a key pad, a dome switch, a touch pad (of a capacitive touch type, a resistive overlay type, an infrared beam type, a surface acoustic wave type, an integral strain gauge type, a piezoelectric type, etc.), a jog wheel, a jog switch, etc., but is not limited thereto. The user interface 240 may include display means, and the user may monitor results of synthesis through the display means. In addition, according to an embodiment, the user may manually control the synthesis device 230 through the user interface 240.

The processor 220 may determine the commands for synthesizing the target product based on the synthesis method. The synthesis method calculated by the external apparatus 100 may include only approximate information about the synthesis of the target product, such as reactants, synthesis temperature, and synthesis time. Specific commands may be required for the synthesis device 230 to actually perform a task, and thus the processor 220 may determine specific commands with respect to the task that the synthesis device 230 needs to actually perform.

For example, the external apparatus 100 may calculate the synthesis method and transmit the calculated synthesis method to the material synthesis apparatus 200 in the form of a first machine language. The processor 220 may determine commands for synthesizing the target product based on the first machine language. The processor 220 may store the determined commands in the form of a second machine language different from the first machine language, and may control the synthesis device 230 using the commands.

Machine language may be a programming language such as Python, Ruby, Scala, Java, C++, C#, etc., or a markup language such as Hypertext Markup Language (HTML), Extensible Markup Language (XML), Java Script Object Notation (JSON), Cascading Style Sheet (CSS), Java Server Pages (JSP), etc., but is not necessarily limited thereto.

The first machine language may include information about the synthesis method of the target product, and the second machine language may include commands for controlling the synthesis device 230. For example, the first machine language may be the markup language such as JSON, and the second machine language may be the programming language such as C++. The calculated synthesis method may be transmitted to the material synthesis apparatus 200 in the form of a JSON file, and the commands for controlling the synthesis device 230 may be stored in the form of a C++ file.

The processor 220 may determine first commands for synthesizing the target product based on the first synthesis method.

For example, when the first synthesis method is 'dissolving 100 g of reactant A and 50 g of reactant B in 500 ml of solvent C, and reacting for 6 hours at a temperature of 120° C.', commands for controlling the storage device 331 may be 'putting out reactant A, reactant B, and solvent C' and 'bring reactant A, reactant B, and solvent C into the storage device 331'.

In addition, commands for controlling the carrier 332 may be 'transferring reactant A, reactant B and solvent C from the storage device 331 to the dispenser 333' and 'transferring reactant A, reactant B and solvent C to the dispenser 333 to the storage device 331'. In addition, commands for controlling the dispenser 333 may be 'injecting 100 g of reactant A into a reaction vessel', 'injecting 50 g of reactant B into the reaction vessel', and 'injecting 500 ml of solvent C into the reaction vessel'.

Also, commands for controlling the reactor 334 may be 'increasing a temperature of the reaction vessel to 120° C.' and 'maintaining the temperature of the reaction vessel at 120° C. for 6 hours'. In addition, commands for controlling the collector 335 and the analyzer 336 may be 'collecting 1 ml of a sample from the reaction vessel' and 'measuring an amount of production of the target product present in the sample'.

The processor 220 may schedule an order in which the determined commands are executed. The determined commands may be performed in an appropriate order when the processor 220 schedules the order in which the determined commands are executed. Accordingly, synthesis according to the synthesis method calculated by the external apparatus 100 may be substantially performed, and the operation of the synthesis device 230 may be optimized while the synthesis is in progress.

For example, when the synthesis method of the target product is 'dissolving 100 g of reactant A and 50 g of reactant B in 500 ml of solvent C, and reacting at the temperature of 120° C. for 6 hours', the determined commands may be scheduled in the order of 'putting out reactant A, reactant B, and solvent C', 'transferring reactant A, reactant B and solvent C from the storage device 331 to the dispenser 333', 'injecting 100 g of reactant A into a reaction vessel', 'injecting 50 g of reactant B into the reaction vessel', 'injecting 500 ml of solvent C into the reaction vessel', 'transferring reactant A, reactant B and solvent C to the dispenser 333 to the storage device 331', 'bring reactant A, reactant B, and solvent C into the storage device 331', 'increasing a temperature of the reaction vessel to 120° C.', 'maintaining the temperature of the reaction vessel at 120° C. for 6 hours', 'collecting 1 ml of a sample from the reaction vessel' and 'measuring an amount of production of the target product present in the sample'.

The processor 220 may feed back results of synthesis according to the first synthesis method. To this end, the processor 220 may transmit the results of synthesis according to the first synthesis method to the external apparatus 100 through the communication interface 210. The results of synthesis may include at least one of a yield of a target product, an amount of yield, and a time required for synthesis.

The processor 220 may determine second commands for synthesizing the target product based on the second synthesis method. The second synthesis method may be calculated by the external apparatus 100 using the previously trained synthesis prediction model. The second synthesis method may be a different synthesis method from the first synthesis method. The second synthesis method may be a synthesis method in which at least one of a synthesis route and synthesis conditions changes based on a first synthesis result.

For example, when a solvent of the first synthesis method is N,N-Dimethylacetamide (DMAc), a solvent of the second synthesis method may be N,N-Dimethylformamide (DMF). When a synthesis temperature of the first synthesis method is 120° C., a synthesis temperature of the second synthesis method may be 130° C.

The processor 220 may determine second commands for synthesizing the target product based on the second synthesis method. For example, the second commands may be commands 'injecting 500 ml of solvent D into the reaction vessel' changed from the first command 'injecting 500 ml of solvent C into the reaction vessel', and 'increasing a temperature of the reaction vessel to 130° C.', 'maintaining the temperature of the reaction vessel at 130° C. for 6 hours' respectively changed from the first commands 'increasing a temperature of the reaction vessel to 120° C.' and 'maintaining the temperature of the reaction vessel at 120° C. for 6 hours'. The processor 220 may schedule an order in which the second commands are executed, and control the synthesis device 230 based on the scheduled order of the second commands.

The external apparatus 100 may determine that the material synthesis apparatus 200 stops synthesis of the target product based on the results of synthesis, and transmit a stop command to the material synthesis apparatus 200. The communication interface 210 may receive the stop command, and the processor 220 may control the synthesis device 230 to end synthesis of the target product according to the stop command.

The stop command may be determined by the external apparatus 100 based on the first synthesis result. For example, the external apparatus 100 may calculate a value obtained by subtracting a target synthesis result from the first synthesis result, and, based on whether the value obtained by subtracting the target synthesis result from the first synthesis result satisfies a preset condition, determine whether to stop synthesis of the target product.

The first synthesis result may be a quantitative indicator related to a yield, an amount of yield, or a time required for synthesis of the target product. When the quantitative indicator with respect to the first synthesis result is the yield, the preset condition may be '0% or more'. For example, when the target yield is 80% and the yield by the first synthesis result is 85%, because the first synthesis result−the target synthesis result≥0%, the external apparatus 100 determines to stop synthesis of the target product.

When the quantitative indicator with respect to the first synthesis result is the amount of yield, the preset condition may be '10 g or more'. For example, when a target amount of yield is 100 g and an amount of yield of the target product by the first synthesis result is 120 g, because the first synthesis result−the target synthesis result≥10 g, the external apparatus 100 determines to stop synthesis of the target product.

When the quantitative indicator with respect to the first synthesis result is the time required for synthesis, the preset condition may be '1 hour or less'. For example, when a target time required for synthesis is 12 hours and a time required for synthesis of the target product according to the first synthesis result is 8 hours, because the first synthesis result−the target synthesis result≤1 hour, the external apparatus 100 determines to stop synthesis of the target product.

As described above, according to the present disclosure, the processor 220 feeds back the results of synthesis to the external apparatus 100 until the synthesis condition is optimized, and the external apparatus 100 repetitively calculates new synthesis methods until the fed back results of synthesis satisfy the preset condition. Accordingly, the material synthesis apparatus 200 of the present disclosure may perform optimal synthesis on the target product.

Also, the stop command may be determined by the external apparatus 100 based on the intermediate production information. For example, the external apparatus 100 calculates a value obtained by subtracting the intermediate production information from prediction production information, and based on whether the value obtained by subtracting the intermediate production information from the prediction production information satisfies a preset condition, determines whether to stop the synthesis of the target product.

The intermediate production information may be a quantitative indicator related to an amount of production of the target product or a ratio of the target product to a reactant. When the quantitative indicator with respect to the intermediate production information is the amount of production of the target product, the preset condition may be '5 g or more'. For example, when the prediction amount of production is 15 g and the amount of production according to the intermediate production information is 5 g, because the prediction production information–the intermediate production information≥5 g, the external apparatus 100 determines whether to stop the synthesis of the target product.

When the quantitative indicator with respect to the target synthesis result is the molar ratio of the target product to the reactant, the preset condition may be '0.1 or more'. For example, when a prediction molar ratio is 0.5 and the molar ratio according to the intermediate production information is 0.3, because the prediction production information–the intermediate production information≥0.1, the external apparatus 100 determines whether to stop the synthesis of the target product.

As described above, the external apparatus 100 uses the intermediate production information of the target product to confirm a progress of the synthesis of the target product. When it is predicted that final production information will not satisfy the target synthesis result because the intermediate production information does not satisfy the preset condition, the external apparatus 100 causes the synthesis in progress to end. Accordingly, the material synthesis apparatus 200 of the present disclosure may be utilized more efficiently.

Hereinafter, operations of the material synthesis apparatus 200 will be described in more detail with reference to FIGS. 2 and 3.

Figure 2:
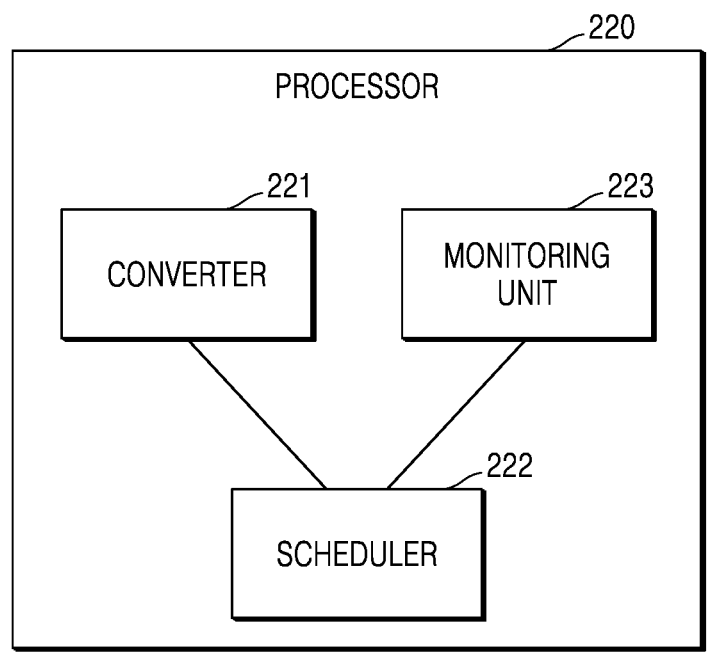
FIG. 2 is a block diagram illustrating a configuration of a processor according to an embodiment.

FIG. 2 is a block diagram illustrating a configuration of the processor 220 according to an embodiment.

The processor 220 may include a converter 221, a scheduler 222, and a monitoring unit 223. The converter 221 may determine commands for controlling the synthesis device 230 based on a synthesis method transmitted in the form of a first machine language, and store the determined commands in the form of a second machine language different from the first machine language. For example, the synthesis method is transmitted to the material synthesis apparatus 200 in the form of a JSON file, and the converter 221 determines the commands for controlling the synthesis device 230 based on the synthesis method. The converter 221 stores the determined commands in the form of a C++ file, and the processor 220 controls the synthesis device 230 using the stored commands.

The scheduler 222 may schedule an order in which the commands stored in the form of second machine language are executed. The commands may include a plurality of control commands, and the control commands may be transmitted to the synthesis device 230 at different times. When each control command is transmitted to the synthesis device 230, the synthesis device 230 may execute the transmitted control command.

The monitoring unit 223 may monitor an operating state of the synthesis device 230. The operating state of the synthesis device 230 may be a state in which the transmitted control command is being executed or a state in which the transmitted control command is completed. When the synthesis device 230 completes execution of the transmitted control command, the synthesis device 230 may transmit a completion signal to the processor 220 or may not operate for a preset period of time. The monitoring unit 223 may monitor the operating state based on the completion signal or whether the synthesis device 230 operates for the preset period of time.

Figure 3:
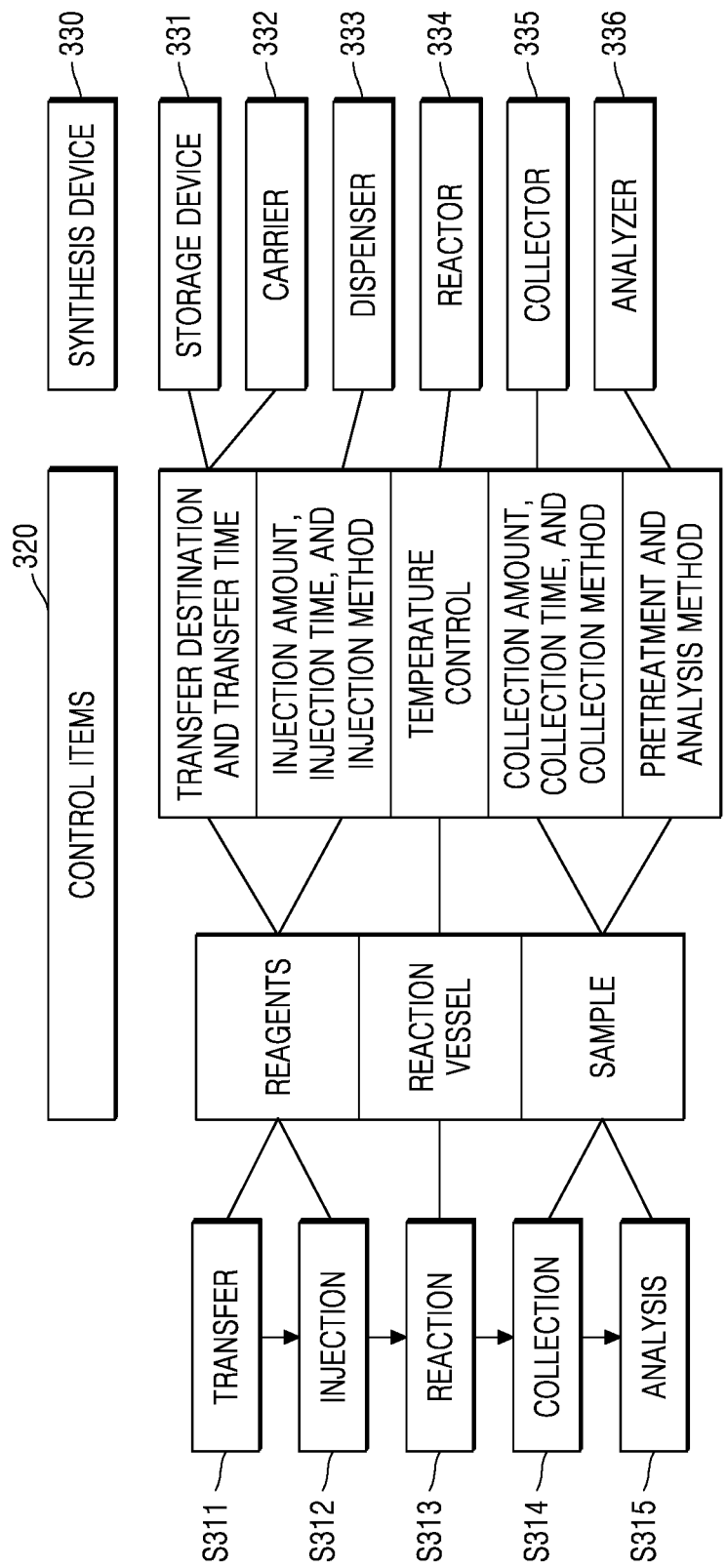
FIG. 3 is a diagram illustrating a method, performed by the processor, of controlling a synthesis device according to an embodiment.

FIG. 3 is a diagram illustrating a method, performed by the processor 220, of controlling a synthesis device 330 according to an embodiment.

The processor 220 may control the synthesis device 330 according to control items 320 of synthesis operations.

In a transfer operation S311, the processor 120 may transmit commands about a destination and a transfer time of reagents to a storage device 431 and a carrier 432, in order to control the transfer of the reagents. The storage device 331 may put out the reagents, and the carrier 332 may transfer the reagents to a dispenser 333.

In an injection operation S312, the processor 220 may transmit commands about the injection amount, injection time, and injection method of the reagents to the dispenser 333, in order to control the injection of the reagents. The dispenser 333 may dispense the reagents and inject the reagents into a reaction vessel of a reactor 334.

In a reaction operation S313, the processor 220 may transmit commands about control of the temperature of the reaction vessel to the reactor 334, in order to control a reaction. The reactor 334 may heat or cool the reaction vessel to control the reaction.

In a collection operation S314, the processor 220 may transmit commands about the collection amount, collection time, and collection method of a sample to a collector 335, in order to control the collection of the sample. The collector 335 may collect the sample during or after the reaction and may transfer the sample to the analyzer 336.

In an analysis operation S315, the processor 220 may transmit commands about pretreatment and analysis methods to the analyzer 336, in order to analyze the sample. The analyzer 236 may pretreat the sample and analyze the sample, and may transmit results of the analysis to the processor 220. The pretreatment may refer to a treatment which is performed on the sample before the analysis of the sample for accurate analysis of the sample. For example, the pretreatment may be precipitation, filtration, distillation, extraction, etc., but is not necessarily limited thereto.

Figure 4:
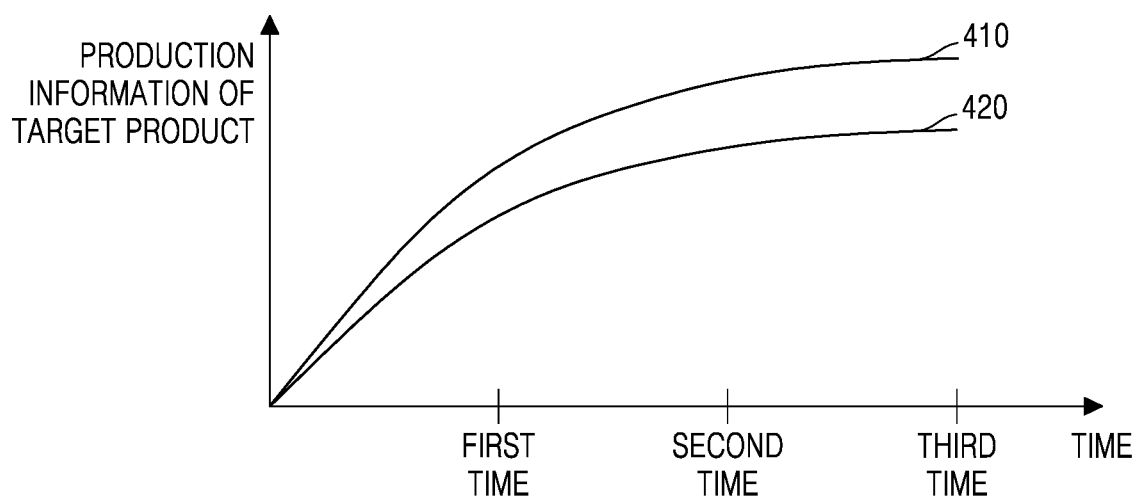
FIG. 4 is a diagram illustrating a condition according to which an external apparatus transmits a stop command to a processor according to an embodiment.

FIG. 4 is a diagram illustrating a condition in which the external apparatus 100 transmits a stop command to the processor 220 according to an embodiment.

A graph 410 indicates prediction production information of a target product predicted by the external apparatus 100 using a previously trained synthesis prediction model, and a graph 420 indicates actual production information of the target product based on a synthesis method. The actual production information of the graph 420 is smaller than the prediction production information of the graph 410.

Referring to FIG. 4, the processor 220 may obtain intermediate production information of the target product at a preset time, and transmit the intermediate production information to the external apparatus 100 through the communication interface 210. The intermediate production information of the target product may include an amount of production of the target product or a ratio of the target product to a reactant, but is not necessarily limited thereto.

The processor 220 may transmit the intermediate production information of the target product to the external apparatus 100 at a first time. In addition, the processor 220 may transmit the intermediate production information of the target product to the external apparatus 100 at a second time greater than the first time. In addition, the processor 220 may transmit the intermediate production information of the target product to the external apparatus 100 at a third time greater than the second time.

The external apparatus 100 may predict prediction production information of the target product at the first time, the second time, and the third time by using the previously trained synthesis prediction model. When a value obtained by subtracting intermediate production information of the first time from the prediction production information of the first time does not satisfy a preset condition, the external apparatus 100 may determine to stop synthesis of the target product, and transmit a stop command to the material synthesis apparatus 200. In addition, when a value obtained by subtracting intermediate production information of the second time from the prediction production information of the second time does not satisfy the preset condition, the external apparatus 100 may determine to stop synthesis of the target product, and transmit the stop command to the material synthesis apparatus 200. In addition, when a value obtained by subtracting intermediate production information of the third time from the prediction production information of the third time does not satisfy the preset condition, the external apparatus 100 may determine to stop synthesis of the target product, and transmit the stop command to the material synthesis apparatus 200.

As described above, in the present disclosure, because the processor 220 transmits the intermediate production information of the target product at the preset time to the external apparatus 100, the external apparatus 100 may confirm whether the synthesis of the target product proceeds and a progress of the synthesis of the target product. When it is predicted that final generation information will not satisfy a target synthesis result because the intermediate production information does not satisfy the preset condition, the external apparatus 100 causes the synthesis in progress to end. Accordingly, the material synthesis apparatus 200 of the present disclosure may be utilized more efficiently.

Figure 5:
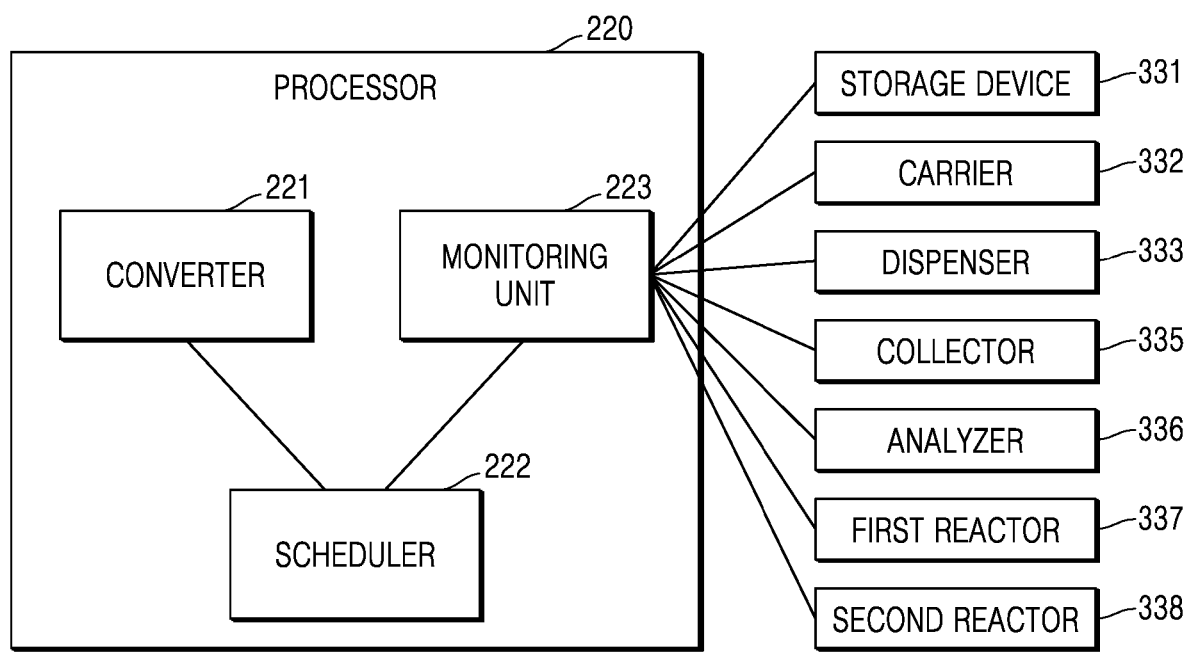
FIG. 5 is a block diagram illustrating a processor controlling a plurality of synthesis devices according to an embodiment.

FIG. 5 is a block diagram illustrating the processor 220 controlling a plurality of synthesis devices 230 according to an embodiment.

Referring to FIG. 5, the processor 220 may control the plurality of synthesis devices 230. For example, the synthesis device 230 may control at least one of the storage device 331, the carrier 332, the dispenser 333, the reactor 334, the collector 335, and the analyzer 336.

In an embodiment, the reactor 334 may be a plurality of reactors, for example, a first reactor 337 and a second reactor 338. When the reactor 334 is the plurality of reactors 334, a target product may be synthesized using a plurality of synthesis methods. For example, a synthesis method of the target product in the first reactor 337 may be 'dissolving 100 g of reactant A and 50 g of reactant B in 500 ml of solvent C, and reacting for 6 hours at a temperature of 120° C.', and a synthesis method of the target product in the second reactor 338 may be 'dissolving 100 g of reactant A and 50 g of reactant B in 500 ml of solvent C, and reacting for 4 hours at a temperature of 130° C.'

As the number of reactors 334 increases, the number of synthesis methods that may be simultaneously performed by the external apparatus 100 using the material synthesis apparatus 200 may increase. In order to find optimal synthesis conditions for the target product, synthesis may have to be performed with respect to a plurality of candidate synthesis methods. When synthesis is to be performed with respect to the plurality of candidate synthesis methods, the external apparatus 100 performs synthesis with respect to the plurality of candidate synthesis methods using the plurality of reactors 334, thereby promptly finding the optimal synthesis conditions.

The processor 220 may monitor an operating state of the synthesis device 230 and control the synthesis device 230 based on the operating state. In an embodiment, the processor 220 may transmit a first control command to the synthesis device 230, monitor whether execution of the first control command is completed, and, after the execution of the first control command is completed, transmit a second control command to the synthesis device 230.

When the synthesis device 230 includes the dispenser 333 and includes only one reactor, the first control command transmitted to the dispenser 333 may be 'injecting 100 g of reactant A into a reaction vessel of the reactor 334', and the second control command may be 'injecting 50 g of reactant B into the reaction vessel of the reactor 334'. When the dispenser 333 receives the first control command, the dispenser 333 injects 100 g of the reactant A into the reaction vessel of the reactor 334. The processor 220 monitors whether injection of the reactant A is completed, and after the injection of the reactant A is completed, transmits the second control command. When the dispenser 333 receives the second control command, the dispenser 333 injects 50 g of reactant B into the reaction vessel of the reactor 334.

When the synthesis device 230 includes the dispenser 333 and includes the plurality of reactors 334, the first control command transmitted to the dispenser 333 may be 'injecting 100 g of reactant A into a reaction vessel of the first reactor 337', and the second control command may be 'injecting 50 g of reactant B into the reaction vessel of the first reactor 337' or 'injecting 100 g of reactant A into a reaction vessel of the second reactor 338'. When the dispenser 333 receives the first control command, the dispenser 333 injects 100 g of the reactant A into the reaction vessel of the first reactor 337. The processor 220 monitors whether injection of the reactant A is completed, and after the injection of the reactant A is completed, determine one of 'injecting 100 g of reactant A into a reaction vessel of the first reactor 337' and 'injecting 100 g of reactant A into the reaction vessel of the second reactor 338' as the second control command and transmits the determined second control command to the dispenser 333. When the dispenser 333 receives the second control command, the dispenser 333 executes the second control command.

Even when the processor 220 transmits the second control command to the synthesis device 230 before the synthesis device 230 completes the execution of the previously transmitted first control command, the synthesis device 230 may execute the second control command after completing the execution of the first control command. However, when a stop command or a changed synthesis method is transmitted from the external apparatus 100 to the processor 220 after the second control command is transmitted to the synthesis device 230, the synthesis device 230 executes the second control command which is unnecessary according to the stop command or the changed synthesis method.

However, when the processor 220 transmits the second control command to the synthesis device 230 after the synthesis device 230 completes the execution of the previously transmitted first control command, while the synthesis device 230 executes the first control command, the execution of the unnecessary control command caused by the transmission of the stop command or the changed synthesis method from the external apparatus 100 may be prevented.

In addition, the control commands may have different times required to complete the execution of the control commands. When the plurality of synthesis devices 230 are of the same type and many control commands requiring a long time to complete the execution of the control commands are transmitted only to one of the plurality of synthesis devices 230 of the same type, execution of a control command that is transmitted later may be delayed. However, when the second control command is transmitted to the synthesis device 230 that has completed the execution of the previously transmitted first control command, the execution of the second control command may proceed without delay, and thus an actual synthesis time of the target product may be reduced.

As described above, according to the present disclosure, the processor 220 monitors the operating state of the synthesis device 230 and controls the synthesis device 230 based on the operating state, and thus the operation of the synthesis device 230 may be optimized. Accordingly, results of synthesis of the synthesis method of the target product calculated by the external apparatus 100 within the shortest time may be obtained.

Figure 6:
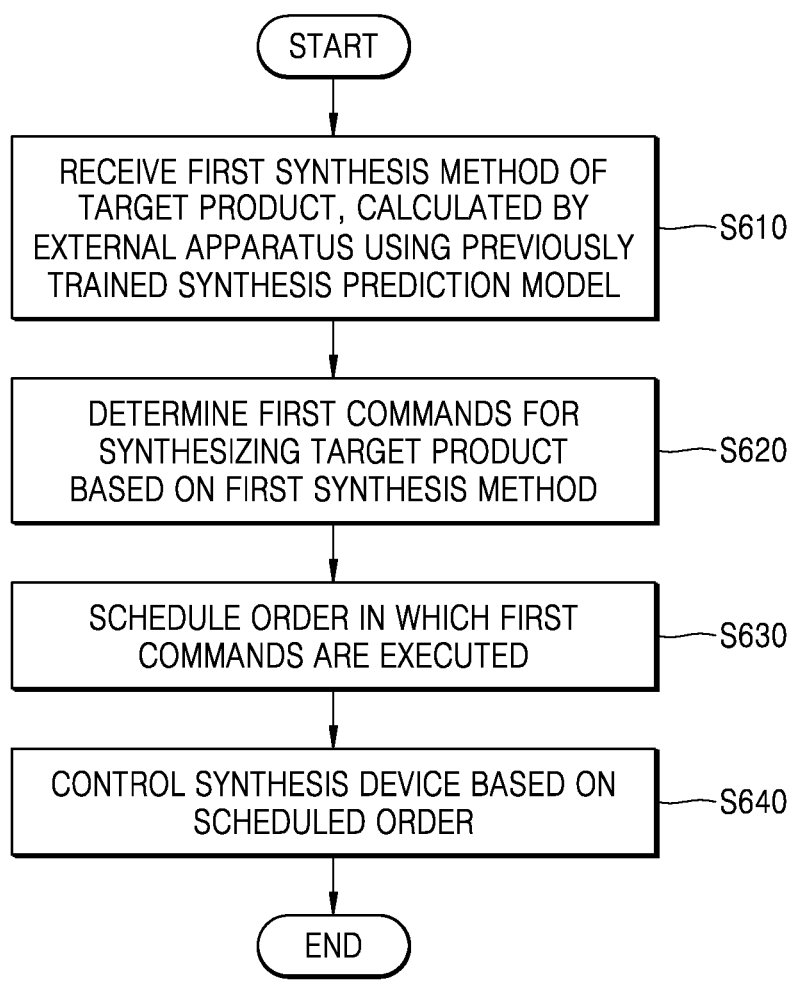
FIG. 6 is a flowchart illustrating an operating method of a material synthesis apparatus according to an embodiment.

FIG. 6 is a flowchart illustrating an operating method of the material synthesis apparatus 200 according to an embodiment.

Referring to FIG. 6, the operating method of the material synthesis apparatus 200 includes operations that are time-serially processed by the material synthesis apparatus 200 illustrated in FIG. 1. Accordingly, it may be seen that the descriptions given with reference to FIGS. 1 to 5 are also applied to the operating method of the material synthesis apparatus 200 even though descriptions are omitted below.

In operation S610, the material synthesis apparatus 200 may receive a first synthesis method of a target product calculated by the external apparatus 100 using a previously trained synthesis prediction model, through the communication interface 210.

A synthesis method may be prepared in the form of a JSON file, and the JSON file may be received by the communication interface 210 or may be obtained from a user through the user interface 240.

In operation S620, the processor 220 may determine first commands for synthesizing the target product based on the first synthesis method.

The external apparatus 100 may calculate the first synthesis method and transmit the calculated first synthesis method to the material synthesis apparatus 200 in the form of a first machine language. The processor 220 may determine first commands for controlling the synthesis device 230 based on the first synthesis method transmitted in the form of the first machine language, and store the determined first commands in the form of a second machine language different from the first machine language.

In operation S630, the processor 220 may schedule an order in which the first commands are executed.

The processor 220 schedules the order in which the first commands are executed, so that the first commands may be performed in an appropriate order. Accordingly, a synthesis according to the first synthesis method calculated by the external apparatus 100 may be substantially performed, and the operation of the synthesis device 230 may be optimized while the synthesis is in progress.

In operation S640, the processor 220 may control the synthesis device 230 based on the first scheduled order.

The processor 220 controls the synthesis device 230, and thus the target product by using the first synthesis method may be generated.

Figure 7:
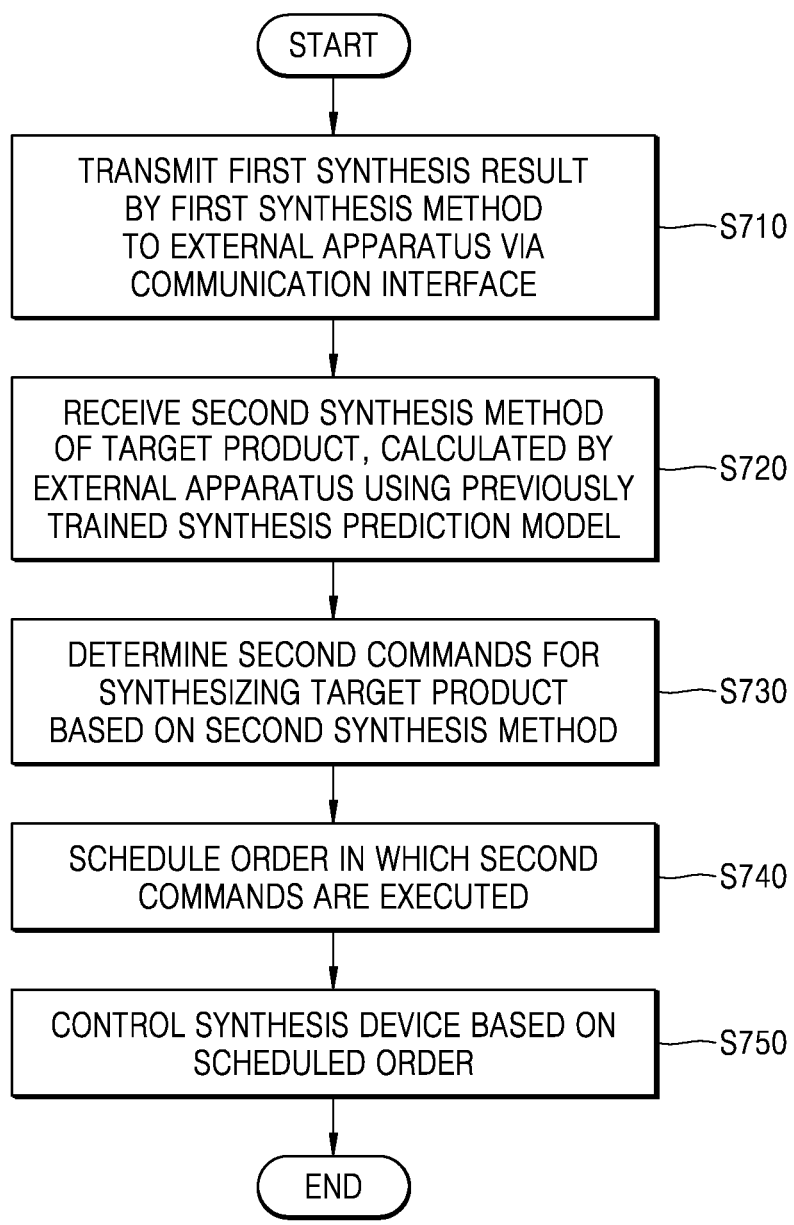
FIG. 7 is a flowchart illustrating a feedback method of a material synthesis apparatus according to an embodiment.

FIG. 7 is a flowchart illustrating a feedback method of the material synthesis apparatus 200 according to an embodiment.

Referring to FIG. 7, in operation S710, the material synthesis apparatus 200 may transmit results of synthesis by using a first synthesis method to the external apparatus 100 through the communication interface 210.

The results of synthesis may include at least one of a yield, an amount of yield, and a time required for synthesis, but is not necessarily limited thereto.

In operation S720, the material synthesis apparatus 200 may receive a second synthesis method of a target product calculated by the external apparatus 100 using a previously trained synthesis prediction model, through the communication interface 210.

The second synthesis method may be a different synthesis method from the first synthesis method. The second synthesis method may be a synthesis method in which at least one of a synthesis route and synthesis conditions of the first synthesis method changes based on a first synthesis result. For example, when a solvent of the first synthesis method is N,N-Dimethylacetamide (DMAc), a solvent of the second synthesis method may be N,N-Dimethylformamide (DMF). When a synthesis temperature of the first synthesis method is 120° C., a synthesis temperature of the second synthesis method may be 130° C.

In operation S730, the processor 220 may determine second commands for synthesizing the target product based on the second synthesis method.

For example, the second commands may be commands 'injecting 500 ml of solvent D into the reaction vessel' changed from the first command 'injecting 500 ml of solvent C into the reaction vessel', and 'increasing a temperature of the reaction vessel to 130° C.', 'maintaining the temperature of the reaction vessel at 130° C. for 6 hours' respectively changed from the first commands 'increasing a temperature of the reaction vessel to 120° C.' and 'maintaining the temperature of the reaction vessel at 120° C. for 6 hours'.

In operation S740, the processor 220 may schedule an order in which the second commands are executed.

The processor 220 schedules the order in which the second commands are executed, so that the second commands are executed in an appropriate order, and thus synthesis according to the second synthesis method calculated by the external apparatus 100 may substantially proceed, and the operation of the synthesis device 230 may be optimized during the synthesis.

In operation S750, the processor 220 may control the synthesis device 230 based on the scheduled order.

The processor 220 controls the synthesis device 230, and thus the target product by using the second synthesis method may be produced.

Figure 8:
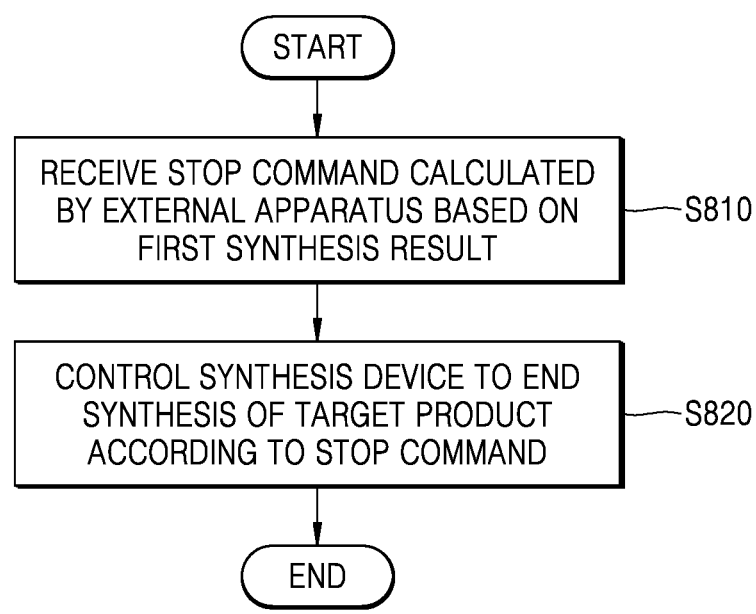
FIG. 8 is a flowchart illustrating a method of controlling a synthesis device to end a synthesis of a target product according to an embodiment.

FIG. 8 is a flowchart illustrating a method of controlling a synthesis device to end a synthesis of a target product according to an embodiment.

Referring to FIG. 8, in operation S810, the material synthesis apparatus 200 may receive a stop command calculated by the external apparatus 100 based on results of synthesis.

The processor 220 may obtain results of synthesis of the target product at a preset time, and transmit the results of synthesis to the external apparatus 100 through the communication interface 210. When a value obtained by subtracting a target synthesis result from the results of synthesis satisfies a preset condition, the external apparatus 100 may determine to stop the synthesis of the target product and transmit a stop command to the material synthesis apparatus 200.

In operation S820, the processor 220 may control the synthesis device 230 to end the synthesis of the target product according to the stop command. The processor 220 controls the synthesis device 230, and thus the synthesis of the target product may be completed.

Figure 9:
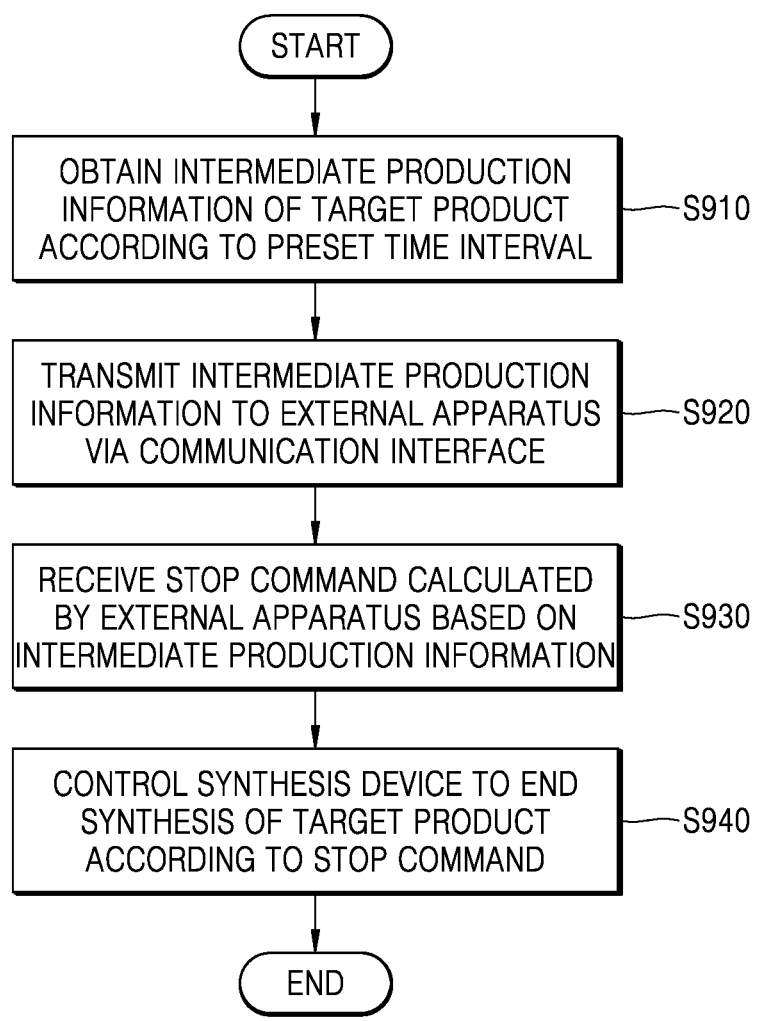
FIG. 9 is a flowchart illustrating a method of controlling a synthesis device to end a synthesis of a target product according to an embodiment.

FIG. 9 is a flowchart illustrating a method of controlling a synthesis device to end a synthesis of a target product according to an embodiment.

Referring to FIG. 9, in operation S910, the material synthesis apparatus 200 may obtain intermediate production information of the target product at a preset time. The intermediate production information of the target product may include an amount of production of the target product or a ratio of the target product to a reactant, but is not necessarily limited thereto.

In operation S920, the material synthesis apparatus 200 may transmit intermediate production information to the external apparatus 100 through the communication interface 210.

The processor 220 may transmit the intermediate production information of the target product to the external apparatus 100 at a first time. In addition, the processor 220 may transmit the intermediate production information of the target product to the external apparatus 100 at a second time greater than the first time. In addition, the processor 220 may transmit the intermediate production information of the target product to the external apparatus 100 at a third time greater than the second time.

In operation S930, the material synthesis apparatus 200 may receive a stop command calculated by the external apparatus 100 based on the intermediate production information.

The external apparatus 100 may predict prediction production information of the target product at the first time, the second time, and the third time by using a previously trained synthesis prediction model. When a value obtained by subtracting intermediate production information of the first time from the prediction production information of the first time does not satisfy a preset condition, the external apparatus 100 may determine to stop synthesis of the target product, and transmit a stop command to the material synthesis apparatus 200. This may be equally applied to the intermediate production information of the second time and the intermediate production information of the third time.

In operation S940, the processor 220 may control the synthesis device 230 to end the synthesis of the target product according to the stop command. The processor 220 controls the synthesis device 230, and thus the synthesis of the target product may be completed.

Figure 10:
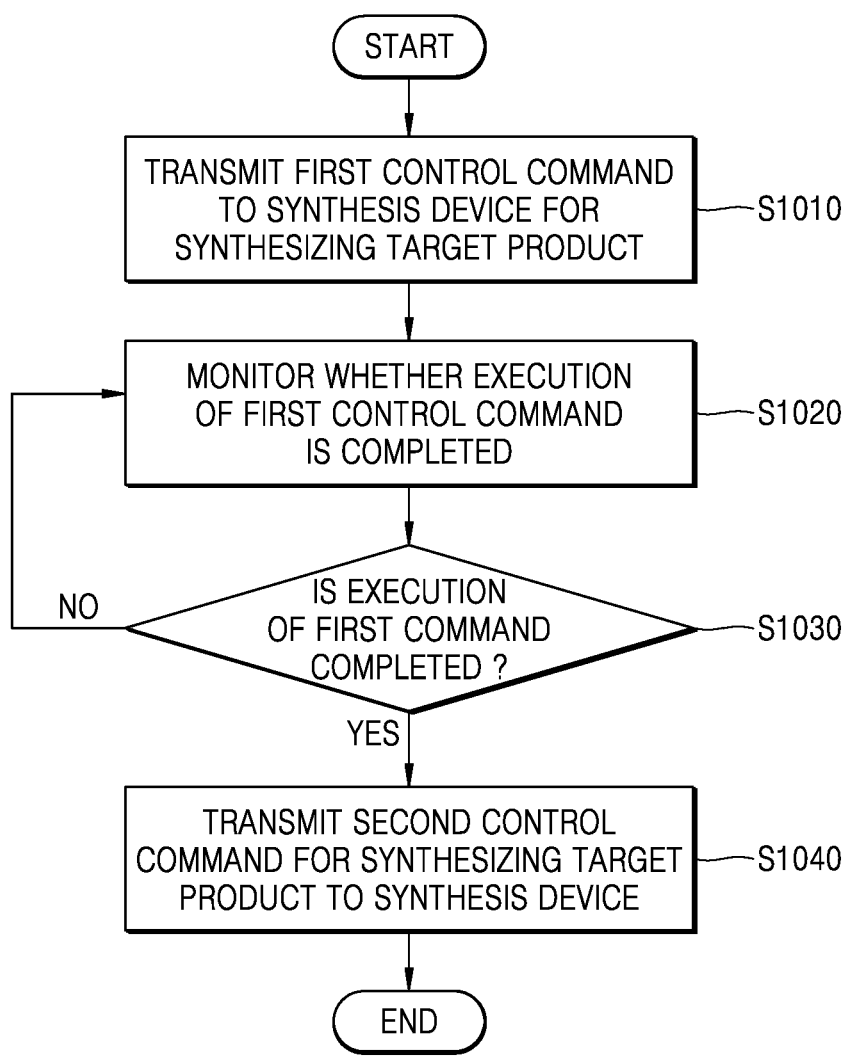
FIG. 10 is a flowchart illustrating a method of controlling a synthesis device based on an operating state of the synthesis device according to an embodiment.

FIG. 10 is a flowchart illustrating a method of controlling the synthesis device 230 based on an operating state of the synthesis device 230 according to an embodiment.

Referring to FIG. 10, in operation S1010, the processor 220 may transmit a first control command for synthesizing a target product to the synthesis device 230.

In operation S1020, the processor 220 may monitor whether execution of the first control command is completed. The operating state of the synthesis device 230 may be a state in which the first control command is being executed or a state in which the first control command is completed.

In operation S1030, the processor 220 may determine whether the execution of the first control command is completed. When the synthesis device 230 completes the execution of the first control command, the synthesis device 230 may transmit a completion signal to the processor 220 or may not operate for a preset period of time. When the processor 220 receives the completion signal or the synthesis device 230 does not operate for the preset period of time, the processor 220 may determine that the execution of the first control command is completed.

In operation S1040, when the execution of the first control command is completed, the processor 220 may transmit a second control command for synthesizing the target product to the synthesis device 230.

When the processor 220 transmits the second control command to the synthesis device 230 after the synthesis device 230 completes the execution of the previously transmitted first control command, while the synthesis device 230 executes the first control command, execution of an unnecessary control command caused by the transmission of a stop command or a changed synthesis method from the external apparatus 100 may be prevented.

In addition, control commands may have different times required to complete the execution of the control commands. When the plurality of synthesis devices 230 are of the same type and many control commands requiring a long time to complete the execution of the control commands are transmitted only to one of the plurality of synthesis devices 230 of the same type, execution of a control command that is transmitted later may be delayed. However, when the second control command is transmitted to the synthesis device 230 that has completed the execution of the previously transmitted first control command, the execution of the second control command may proceed without delay, and thus an actual synthesis time of the target product may be reduced.

Figure 11:
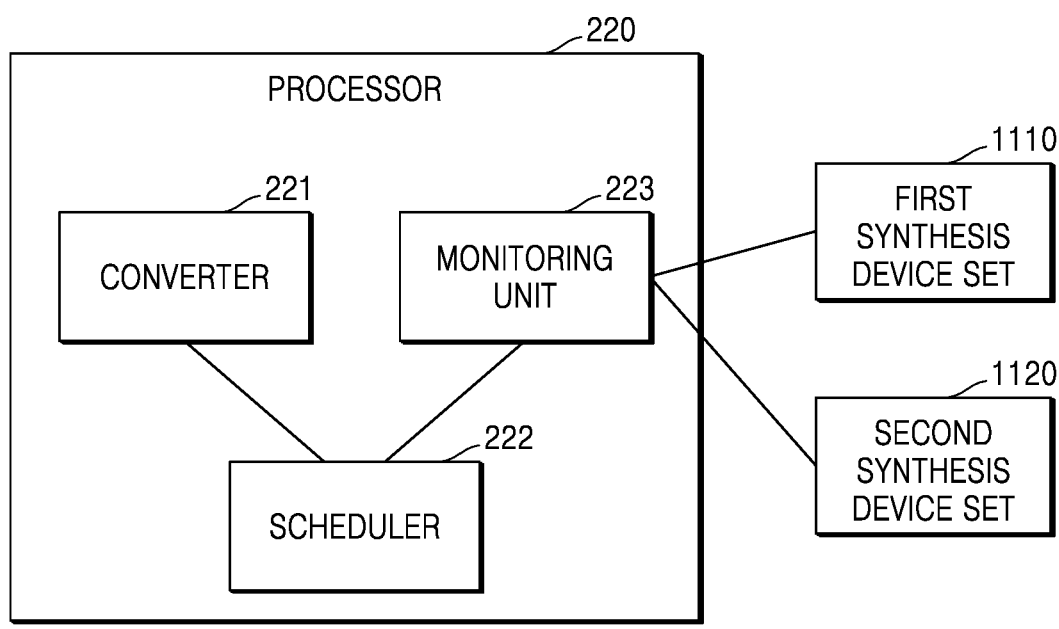
FIG. 11 is a block diagram illustrating a processor that controls a plurality of synthesis device sets according to an embodiment.

FIG. 11 is a block diagram illustrating the processor 220 that controls a plurality of synthesis device sets according to an embodiment.

Referring to FIG. 11, the processor 220 may include the converter 221, the scheduler 222, and the monitoring unit 223. The processor 220 may control the plurality of synthesis device sets such as, for example, a first synthesis device set 1110 and a second synthesis device set 1120. The synthesis device set may include at least one of the storage device 331, the carrier 332, the dispenser 333, the reactor 334, the collector 335, and the analyzer 336. According to an embodiment, the number of synthesis device sets may increase or decrease.

Even when there are the plurality of synthesis device sets, the processor 220 may control the plurality of synthesis device sets sequentially or simultaneously. By controlling a plurality of synthesis device sets, the number of synthesis methods that may be carried out simultaneously is increased, so that it is possible to quickly find the optimal synthesis conditions for the synthesis of the target product.

The embodiments may be written as computer programs and may be implemented in general-use digital computers that execute the programs using non-transitory computer-readable recording media. The information used in the aforementioned embodiments may be recorded in computer-readable recording media through various members. Examples of the non-transitory computer-readable recording media include magnetic storage media (e.g., ROM, floppy disks, and hard disks) and optical reading media (e.g., CD-ROMs and digital video disks (DVDs)).

It will be understood by those of ordinary skill in the art that various changes in form and details may be made therein without departing from the spirit and scope as defined by the above description. For example, the above-described material synthesis apparatus 200 and operating method of the material synthesis apparatus 200 are not limited and applied only to a material synthesis field, and may also be applied to a factory automation field, which is a field similar to the present disclosure, without departing from the characteristics of the material synthesis apparatus 200 and the operating method of the material synthesis apparatus 200. It should be understood that embodiments described herein should be considered in a descriptive sense only and not for purposes of limitation.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A material synthesis apparatus comprising:
   a synthesis device configured to perform a synthesis of a target product;
   memory storing at least one instruction; and
   at least one processor,
   wherein, when executed by the at least one processor, the at least one instruction is configured to control the material synthesis apparatus to:
      obtain a first synthesis method based on a trained synthesis prediction model,
      determine first commands for synthesizing the target product based on the first synthesis method,
      obtain a first schedule order in which the first commands are executed,
      control the synthesis device to perform one or more first operations to synthesize the target product based on the first schedule order,
      obtain, from the synthesis device, a first synthesis result based on performing the one or more first operations to synthesize the target product,
      obtain a second synthesis method of the target product based on the first synthesis result and the trained synthesis prediction model, the second synthesis method being different from the first synthesis method,
      determine second commands for synthesizing the target product based on the second synthesis method,
      obtain a second schedule order in which the second commands are executed, and
      control the synthesis device to perform one or more second operations to synthesize the target product based on the second schedule order,
   wherein the first synthesis result comprises at least one of a yield of the target product, an amount of the yield, and a time required for the synthesis of the target product.

2. The material synthesis apparatus of claim 1, further comprising a communication interface configured to communicate with an external apparatus,
   wherein, when executed by the at least one processor, the at least one instruction is configured to control the material synthesis apparatus to transmit the first synthesis result obtained by using the first synthesis method to the external apparatus via the communication interface.

3. The material synthesis apparatus of claim 2, wherein the communication interface is further configured to receive the second synthesis method of the target product from the external apparatus.

4. The material synthesis apparatus of claim 2, wherein the communication interface is further configured to receive a stop command calculated by the external apparatus based on the first synthesis result, and
   wherein, when executed by the at least one processor, the at least one instruction is configured to control the material synthesis apparatus to control the synthesis device to end the synthesis of the target product according to the stop command.

5. The material synthesis apparatus of claim 2, wherein, when executed by the at least one processor, the at least one instruction is configured to control the material synthesis apparatus to:
   obtain intermediate production information of the target product according to a preset time interval, and
   transmit the intermediate production information to the external apparatus via the communication interface.

6. The material synthesis apparatus of claim 5, wherein the communication interface is further configured to receive a stop command calculated by the external apparatus based on the intermediate production information, and
   wherein, when executed by the at least one processor, the at least one instruction is configured to control the material synthesis apparatus to control the synthesis device to end the synthesis of the target product according to the stop command.

7. The material synthesis apparatus of claim 1, wherein, when executed by the at least one processor, the at least one instruction is configured to control the material synthesis apparatus to:
   monitor an operating state of the synthesis device, and
   control the synthesis device based on the operating state.

8. The material synthesis apparatus of claim 7, wherein the synthesis device comprises at least one of a storage device, a carrier, a dispenser, a reactor, a collector and an analyzer.

9. The material synthesis apparatus of claim 7, wherein, when executed by the at least one processor, the at least one instruction is configured to control the material synthesis apparatus to:
   transmit a first control command to the synthesis device for synthesizing the target product,
   monitor whether execution of the first control command is completed, and
   after the execution of the first control command is completed, transmit a second control command for synthesizing the target product to the synthesis device.

10. The material synthesis apparatus of claim 1, wherein the first synthesis method comprises a first synthesis route and one or more first conditions.

11. The material synthesis apparatus of claim 10, wherein the second synthesis method comprises a second synthesis route and one or more second conditions obtained based on the first synthesis result.

12. An operating method of a material synthesis apparatus, the operating method comprising:
obtaining a first synthesis method of a target product based on a trained synthesis prediction model;
determining first commands for synthesizing the target product based on the first synthesis method;
obtaining a first schedule order in which the first commands are executed;
controlling a synthesis device to perform one or more first operations to synthesize the target product based on the first schedule order;
obtaining, from the synthesis device, a first synthesis result based on performing the one or more first operations to synthesize the target product;
obtaining a second synthesis method of the target product based on the first synthesis result and the trained synthesis prediction model, the second synthesis method being different from the first synthesis method;
determining second commands for synthesizing the target product based on the second synthesis method;
obtaining a second schedule order in which the second commands are executed, and
controlling the synthesis device to perform one or more second operations to synthesize the target product based on the second schedule order,
wherein the first synthesis result comprises at least one of a yield of the target product, an amount of the yield, and a time required for the synthesis of the target product.

13. The operating method of claim 12, further comprising transmitting the first synthesis result obtained by using the first synthesis method to the external apparatus via a communication interface.

14. The operating method of claim 13, further comprising:
receiving the second synthesis method of the target product from the external apparatus.

15. The operating method of claim 13, further comprising:
receiving a stop command calculated by the external apparatus based on the first synthesis result; and
controlling the synthesis device to end a synthesis of the target product according to the stop command.

16. The operating method of claim 12, further comprising:
obtaining intermediate production information of the target product according to a preset time interval;
transmitting the intermediate production information to the external apparatus via a communication interface;
receiving a stop command calculated by the external apparatus based on the intermediate production information; and
controlling the synthesis device to end a synthesis of the target product according to the stop command.

17. The operating method of claim 12, wherein the controlling of the synthesis device comprises:
monitoring an operating state of the module; and
controlling the module based on the operating state.

18. The operating method of claim 17, wherein the synthesis device comprises at least one of a storage device, a carrier, a dispenser, a reactor, a collector and an analyzer.

19. The operating method of claim 17, wherein the controlling of the synthesis device comprises:
transmitting a first control command to the synthesis device for synthesizing the target product;
monitoring whether execution of the first control command is completed; and
after the execution of the first control command is completed, transmitting a second control command for synthesizing the target product to the synthesis device.

20. A non-transitory computer-readable recording medium having recorded thereon a program that, when executed by a processor, causes the processor to:
obtain a first synthesis method of a target product based on a trained synthesis prediction model;
determine first commands for synthesizing the target product based on the first synthesis method;
obtain a first schedule order in which the first commands are executed;
control a synthesis device to perform one or more first operations to synthesize the target product based on the first schedule order;
obtain, from the synthesis device, a first synthesis result based on performing the one or more first operations to synthesize the target product;
obtain a second synthesis method of the target product based on the first synthesis result and the trained synthesis prediction model, the second synthesis method being different from the first synthesis method;
determine second commands for synthesizing the target product based on the second synthesis method;
obtain a second schedule order in which the second commands are executed, and
control the synthesis device to perform one or more second operations to synthesize the target product based on the second schedule order,
wherein the first synthesis result comprises at least one of a yield of the target product, an amount of the yield, and a time required for the synthesis of the target product.

* * * * *